United States Patent [19]

Mennicke et al.

[11] Patent Number: 5,534,052
[45] Date of Patent: Jul. 9, 1996

[54] POLYMERIC DYESTUFFS AND THEIR USE IN INKS FOR INK JET PRINTING PROCESSES

[75] Inventors: Winfried Mennicke, Leverkusen; Karin Hassenrück, Düsseldorf, both of Germany

[73] Assignee: Bayer Aktiengesellschaft, Leverkusen, Germany

[21] Appl. No.: 346,062

[22] Filed: Nov. 29, 1994

[30] Foreign Application Priority Data

Dec. 6, 1993 [DE] Germany .................. 43 41 455.9

[51] Int. Cl.$^6$ .................. C09D 11/02; C09B 69/10
[52] U.S. Cl. .................. 106/22 D; 106/22 K; 106/20 D; 8/647
[58] Field of Search .................. 8/647, 478; 106/20 D, 106/22 R, 22 D, 493, 499, 22 H, 22 K

[56] References Cited

U.S. PATENT DOCUMENTS

| | | |
|---|---|---|
| 3,640,840 | 2/1982 | Zieman et al. . |
| 3,937,851 | 3/1983 | Bellanca et al. . |
| 4,375,357 | 3/1983 | Wingard, Jr. et al. . |
| 4,568,737 | 2/1986 | Tomalia et al. .................. 528/332 |
| 4,664,708 | 5/1987 | Allen . |
| 4,962,190 | 10/1990 | Mayer et al. . |
| 4,975,499 | 12/1990 | Bachem et al. . |
| 5,074,884 | 12/1991 | Mennicke et al. . |
| 5,098,475 | 3/1992 | Winnik et al. .................. 106/22 |
| 5,338,532 | 8/1994 | Tomalia et al. .................. 424/1.49 |

FOREIGN PATENT DOCUMENTS

| | | |
|---|---|---|
| 0223501 | 5/1987 | European Pat. Off. . |
| 0317859 | 5/1989 | European Pat. Off. . |
| 0423561 | 4/1991 | European Pat. Off. . |
| 1325615 | 8/1973 | United Kingdom . |
| 1356025 | 6/1974 | United Kingdom . |

OTHER PUBLICATIONS

Derwent Abstract of JP 59–27973, Feb. 1984.
Tomalia, et al., Angew. Chem. Int. Ed., 1990 no month available, 29, 138.

*Primary Examiner*—Margaret Einsmann
*Attorney, Agent, or Firm*—William C. Gerstenzang; Sprung Horn Kramer & Woods

[57] ABSTRACT

The new polymeric dyestuffs which are obtainable by reaction of

A) Polyamidoamines having an average molecular weight, determined as the weight-average, of 260 to 10,000, which in turn are obtainable by reaction of aliphatic polyamines (I) which contain at least two primary amino groups and at least one secondary amino group, if appropriate as a mixture with diamines (II), with dicarboxylic acids ($\alpha$), with the proviso that the molar ratio of the sum of primary and secondary amino groups contained in (I) and if appropriate (II) to the carboxyl groups in ($\alpha$)>1, and is preferably 1.05 to 3, with B) a dyestuff which contains, per molecule, at least one group which is reactive towards primary and secondary amino groups, the molar ratio of the sum of primary and secondary amino groups contained in A) to B) being 1 to 15, preferably 1 to 10, are outstandingly suitable for dyeing and printing materials containing cellulose groups and amide groups and as recording liquids for ink jet recording systems.

11 Claims, No Drawings

POLYMERIC DYESTUFFS AND THEIR USE IN INKS FOR INK JET PRINTING PROCESSES

The present invention relates to water-soluble polymeric dyestuffs containing covalently bonded polyamidoamine groups and to their use for dyeing and printing materials containing cellulose groups and amide groups and as recording liquids for ink jet recording systems.

Polymeric dyestuffs based on polyethylenimine groups are known and are described, for example, in the Patent literature DE-A 2 018 855, DE-A 2 214 966, U.S. Pat. Nos. 3,937,851, 4,375,357, 4,664,708, 5,098,475 or JA-A 5 927 973. However, such polymeric dyestuffs have an inadequate water-solubility in many cases, in particular below pH 9, so that precipitation and blocking of the printer nozzles can occur during recording of the typeface. It has now been found that the water-solubility is improved if carboxamide groups are incorporated into the polymeric matrix.

The new polymeric dyestuffs are obtainable by reaction of

A) Polyamidoamines having an average molecular weight, determined as the weight-average, of 260 to 10,000, which in turn are obtainable by reaction of aliphatic polyamines (I) which contain at least two primary amino groups and at least one secondary amino group, if appropriate as a mixture with diamines (II), with dicarboxylic acids ($\alpha$), with the proviso that the molar ratio of the sum of primary and secondary amino groups contained in (I) and if appropriate (II) to the carboxyl groups in ($\alpha$)>1, and is preferably 1.05 to 3, with B) a dyestuff which contains, per molecule, at least one group which is reactive towards primary and secondary amino groups, the molar ratio of the sum of primary and secondary amino groups contained in A) to B) being 1 to 15, preferably 1 to 10.

Preferably, for the preparation of the polyamidoamines A), at least one polyamine of the formula (I)

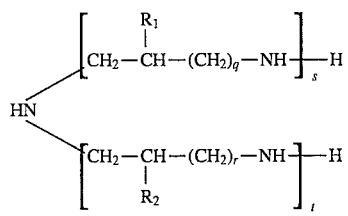

(I)

wherein $R_1$ and $R_2$ independently of one another represent hydrogen, methyl or ethyl, q and r independently of one another represent 0, 1, 2, 3 or 4 and s and t independently of one another represent 1, 2, 3, 4, 5 or 6, or a mixture of at least one polyamine of the formula (I) and at least one diamine of the formula (II)

$$H_2N-R_3-NH_2 \quad (II)$$

wherein $R_3$ represents $C_2-C_9$-alkylene or a divalent radical of the formula

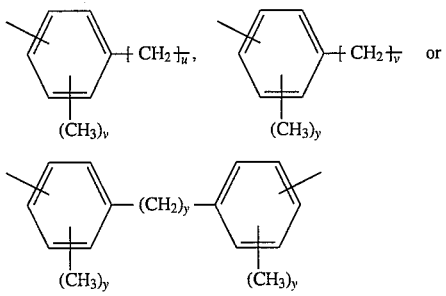

wherein u represents 1 or 2, v represents 0 or 1 and y represents 0, 1, 2 or 3, is subjected to a condensation reaction with at least one dicarboxylic acid ($\alpha$) from the series consisting of aliphatic saturated $C_2-C_{12}$-dicarboxylic acids, olefinically unsaturated $C_4-C_{12}$-dicarboxylic acids and aromatic dicarboxylic acids or functional derivatives thereof, and if appropriate $\omega$-$C_3$-$C_8$-aminocarboxylic acids or lactams thereof.

The molar ratio of the polyamines of the formula (I) to the diamines of the formula (II) and that of the abovementioned dicarboxylic acids or dicarboxylic acid derivatives to the $\omega$-$C_3$-$C_8$-aminocarboxylic acids or lactams thereof can vary within wide limits and in both cases is preferably greater than 1.

The polyamidoamines A) are preferably those having a base equivalent weight of 140 to 800 which are miscible with water in practically all proportions.

Examples of the polyamines of the formula (I) are: diethylenetriamine, triethylenetetramine, tetraethylenepentamine, pentaethylenehexamine, hexaethyleneheptamine, heptaethyleneoctamine, bis (3-aminopropyl)amine, bis(2-aminopropyl)amine, 1,3-bis (2-aminoethylamino)propane, 1,2-bis(2-aminopropylamino)propane, 1,3-bis(3-aminopropyl)propane, bis(hexamethylene)triamine, 1,6-bis(2-aminoethylamino)hexane, 1,6-bis(3aminopropylamino)hexane, N-3-aminopropyltetramethylenediamine or N,N'-bis (3-aminopropyl)tetramethylenediamine. Of these, diethylenetriamine, triethylenepentamine, bis(3-aminopropyl)amine and bis(2-aminopropyl)amine are preferred.

Examples of diamines of the formula (II) are: ethylenediamine, 1,2-diaminopropane, 1,3-diaminopropane, 1,3-diaminobutane, 1,4-diaminobutane, 1,6-diaminohexane, 3-methyl-1,5-diaminopentane, isomer mixture of 2,2,4-trimethyl- and 2,4,4-trimethyl-1,6-diaminohexane, 1,4-diaminocyclohexane, 1-methyl-2,4- and -2,6-diaminocyclohexane, 4,4'-diamino-dicyclohexylmethane, 1,3-bis(4-aminocyclohexyl)propane, 4-aminobenzylamine, 4-aminophenethylamine or 1,3-bis(aminomethyl)benzene. Of these, in turn, ethylenediamine and 1,2-diaminopropane are preferred.

Suitable dicarboxylic acids ($\alpha$) are, for example: oxalic acid, malonic acid, maleic acid, fumaric acid, itaconic acid, succinic acid, glutaric acid, adipic acid, azelaic acid, sebacic acid, 1,12-dodecanedioic acid, terephthalic acid or isophthalic acid. Possible functional derivatives are anhydrides, dialkyl esters or half-esters thereof. Preferred dicarboxylic acids are glutaric acid and adipic acid.

Aminocarboxylic acids and their lactams which may be mentioned are: 6-aminocaproic acid, 8-aminocaprylic acid, 8-capryllactam and, above all, 6-caprolactam.

The polyamidoamines A) which can be used for preparation of the dyestuffs according to the invention are known per se, for example from DE-A 1 771 043, DE-A 3 808 741 or DE-A 3 934 713.

The preparation of the polyamidoamines A) can be carried out in a manner which is likewise known, for example by heating the amine and carboxylic acid components (I), if appropriate with (II) and ($\alpha$) under normal pressure at temperatures of 110° to 250° C., preferably 140° to 210° C. In this process, the mixture is first heated to 100° C. and the temperature is then allowed to rise to 210° C. in the course of several hours, while simultaneously removing the water formed during the reaction. The viscous reaction mass thus formed can be brought to a viscosity favourable for handling by dilution with water.

The dyestuffs B) are derived from known dyestuff classes, for example the class of phthalocyanine, nitroaryl, triphenylmethane, oxazine, triphenedioxazine, phenazine, stilbene, thiazine and xanthene dyestuffs, but above all that of the anthraquinone, monoazo, disazo and polyazo dyestuffs, and furthermore of the metal complex dyestuffs, such as 1:1 nickel, 1:1 copper, 1:1 cobalt or 1:1 chromium complexes, or the symmetric or asymmetric 1:2 cobalt or 1:2 chromium complexes of azo or azomethine dyestuffs having a metal-complexing o,o'-dihydroxy-, o-hydroxy-o'amino- or o-carboxy-o'-hydroxy-azo or -azomethine structure.

The dyestuffs B) are preferably derived from water-soluble dyestuffs of the abovementioned classes which contain, as groups which render them water-soluble and independently of one another, one or more sulphonamide groups, sulphonamide groups which are alkyl-substituted once or twice on the nitrogen, alkylsulphonyl groups, carboxyl groups, carboxylate groups or sulphonate groups. Preferred alkyl groups are methyl, ethyl and hydroxyethyl. Possible counter-ions of the anionic groups are alkali metal ions, in particular lithium, sodium or potassium ions, ammonium ions or the cations of organic amines, in particular mono-, di-, tri- or tetra-lower alkyl-substituted ammonium ions.

The dyestuffs B) contain 1 or 2, preferably one, group or groups reactive towards primary and secondary amino groups.

The groups which are reactive towards primary and secondary amines are preferably aliphatic, aromatic or heterocyclic radicals which contain one or more electrophilic centres, onto which one or more leaving groups are optionally bonded, and which can form a covalent bond by reaction of the electophilic centre with the primary and secondary amino groups of the polyamidoamine A).

The groups which are reactive towards primary and secondary amino groups can be bonded to the dyestuff molecule directly or via a bridge member; preferably, they are bonded to the dyestuff molecule directly or via an optionally monoalkylated amino group, such as, for example, —NH—, —N(CH$_3$)— or —N(C$_2$H$_5$)— or via an aliphatic radical, such as methylene, ethylene, propylene or C$_2$–C$_8$-alkylene, which can be interrupted by one or two oxy groups, or via a bridge member containing an amino group, such as, for example, a phenylamino group.

The groups which are reactive towards primary and secondary amines are preferably those which are known generally in dyestuffs chemistry as "fibre-reactive radicals". Such fibre-reactive radicals are represented, for example, by the following formulae:

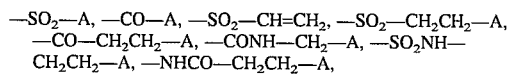

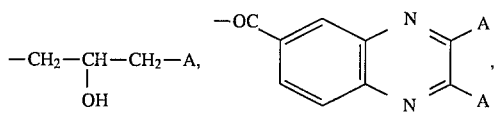

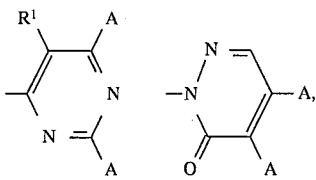

where R$^1$ = H, Cl, CH$_3$, CN

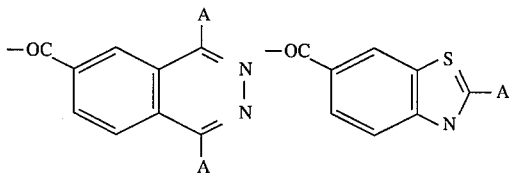

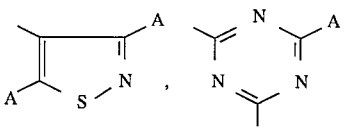

where R = NH$_2$

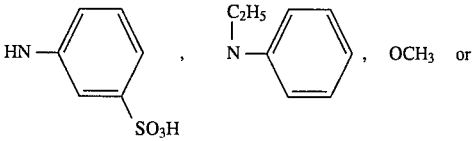

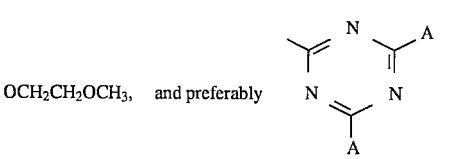

where A=Cl, F, OSO$_3$H, N(CH$_3$)$_3$Cl, SO$_2$CH$_3$, OPO$_3$H and SO$_2$C$_2$H$_5$.

The following reactive radicals may be mentioned as specific examples:

2,4-difluorotriazin-6-yl, 2,4-dichlorotriazin-6-yl, and mono-halogeno-sym.-triazinyl radicals, in particular monochloro- and monofluorotriazinyl radicals which are substituted by alkyl, aryl, amino, monoalkylamino, dialkylamino, aralkylamino, arylamino, morpholino, piperidino, pyrrolidino, piperazino, alkoxy, aryloxy, alkylthio or arylthio, wherein alkyl preferably denotes optionally substituted C$_1$–C$_4$-alkyl, aralkyl preferably denotes optionally substituted phenyl-C$_1$–C$_4$-alkyl and aryl preferably denotes optionally substituted phenyl or naphtyl, and wherein preferred substituents for alkyl are halogen, hydroxy, cyano, vinylsulphonyl, substituted alkylsulphonyl, dialkylamino, morpholino, C$_1$–C$_4$-alkoxy, vinylsulphonyl-C$_2$–C$_4$-alkoxy, substituted alkylsulphonyl-C$_2$–C$_4$-alkoxy, carboxy, sulpho or sulphato, and preferred substituents for phenyl and naphthyl are sulpho, C$_1$–C$_4$-alkyl, C$_1$–C$_4$-alkoxy, carboxy, halogen, acylamino, vinylsulphonyl, substituted alkylsulphonyl, hydroxy and amino.

The following radicals may be mentioned specifically: 2-amino-4-fluoro-triazin-6-yl, 2-methylamino-4-fluoro-triazin-6-yl, 2-ethylamino-4-fluorotriazin-6-yl, 2-isopropylamino-4-fluoro-triazin-6-yl, 2-dimethylamino-4-fluorotriazin-6-yl, 2-diethylamino-4-fluoro-triazin-6-yl, 2-β-methoxy-ethylamino-4-fluoro-triazin-6-yl, 2-β- hydroxyethylamino-4-fluoro-triazin-6-yl, 2-di-(β-hydroxyethylamino)-4-fluoro-triazin-6-yl, 2-di-(β-hydroxyethylamino)-4-fluoro-triazin-6-yl, 2-β-sulphoethylamino-4-fluoro-triazin-6-yl, 2-β-sulphoethyl-methylamino-4-fluoro-triazin-6-yl 2-carboxymethylamino-4-fluoro-triazin-6-yl, 2-di-(carboxymethylamino)-4-fluoro-triazin-6-yl, 2-sulphomethyl-methylamino-4-fluoro-triazin-6-yl, 2-β-cyanethylamino-4-fluoro-triazin-6-yl, 2-benzylamino-4-fluoro-traizin-6-yl, 2-β-phenylethylamino-4-fluoro-triazin-6-yl, 2-benzyl-methylamino-4-fluoro-triazin-6-yl, 2-(4'-sulphobenzyl)-amino-4-fluoro-triazin-6-yl, 2-cyclohexylamino-4-fluoro-triazin-6-yl, 2-(o-, m- or p-methylphenyl)-amino-4-fluoro-triazin-6-yl, 2-(o-, m- or p-sulphophenyl)-amino-4-fluoro-triazin-6-yl, 2-(2',5'-disulphophenyl)-amino-4-fluoro-triazin-6-yl, 2-(o-, m- or p-chlorophenyl)-amino-4-fluoro-triazin-6-yl, 2-(o-, m- or p-methoxyphenyl)-amino-4-fluoro-triazin-6-yl, 2(2'-methyl-4'-sulphophenyl)-amino-4-fluoro-triazin-6-yl, 2-(2'-methyl-5'-sulphophenyl)-amino-4-fluoro-triazin-6-yl, 2-(2'-chloro-4'-sulphophenyl)-amino-4-fluoro-triazin-6-yl, 2-(2'-chloro-5'-sulphophenyl)-amino-4-fluoro-triazin-6-yl, 2-(2'-methoxy-4'-sulphophenyl)-amino-4-fluorotriazin-6-yl, 2-(o-, m- or p- carboxyphenyl)-amino-4-fluoro-triazin-6-yl, 2-(2'-,4'-disulphophenyl)-amino-4-fluoro-triazin-6-yl, 2-(3', 5'-disulphophenyl)-amino-4-fluoro-triazin-6-yl, 2-(2'-carboxy-4'-sulphophenyl)-amino-4-fluoro-triazin-6-yl, 2-(2'-carboxy-5'-sulphophenyl)-amino-4-fluoro-triazin-6-yl, 2-(6'-sulphonaphth-2'-yl)-amino-4-fluoro-triazin-6-yl, 2-(4', 8'-disulphonaphth-2'-yl)-amino-4-fluoro-triazin-6-yl, 2-(6', 8'-disulphonaphth-2'-yl)-amino-4-fluoro-triazin-6-yl, 2-(N-methyl-N-phenyl)-amino-4-fluoro-triazin-6-yl, 2-(N-ethyl-N-phenyl)-amino-4-fluoro-triazin-6-yl, 2-(N-β-hydroxyethyl-N-phenyl)-amino-4-fluoro-triazin-6-yl, 2-(N-iso-propyl-N-phenyl)-amino-4-fluoro-triazin-6-yl, 2-morpholino-4-fluoro-triazin-6-yl, 2-piperidino-4-fluoro-triazin-6-yl, 2(4',6',8,'-trisulphonaphth-2'-yl)-amino-4-fluoro-triazin-6-yl, 2-(3',6',8'-trisulphonaphth-2'-yl)-amino-4-fluoro-triazin-6-yl, 2-(3',6'-disulphonaphth-1'-yl)-amino-4-fluoro-triazin-6-yl, N-methyl-N-(2,4-di-chlorotriazin-6-yl)-carbamyl, N-methyl-N-(2-methyl-amino-4-chlorotriazin-6-yl)-carbamyl, N-methyl-N-(2-dimethylamino-4-chlorotriazin-6-yl)-carbamyl, N-methyl, or N-ethyl-N-(2,4-dichlorotriazin-6-yl)-aminoacetyl, 2-methoxy-4-fluoro-triazin-6-yl, 2-ethoxy-4-fluoro-triazin-6-yl, 2-phenoxy-4-fluoro-triazin-6-yl, 2-(o-, m- or p-sulphophenoxy)-4-fluoro-triazin-6-yl, 2-(o-, m- or p-methyl- or -methoxy phenoxy)-4-fluoro-triazin-6-yl, 2-β-hydroxyethylmercapto-4-fluoro-triazin-6-yl, 2-phenylmercapto-4-fluoro-triazin-6-yl, 2-(4'-methylphenyl)-mercapto-4-fluorotriazinyl, 2-(2',4'-dinitrophenyl)-mercapto-4-fluoro-triazin-6-yl, 2-methyl-4-fluoro-triazin-6-yl, 2-phenyl-4-fluoro-triazin-6-yl and the corresponding 4-chloro- and 4-bromotriazinyl radicals and the corresponding radicals obtainable by halogen replacement with tertiary bases, such as trimethylamine, triethylamine, dimethyl-β-hydroxyethylamine, triethanolamine, N,N-dimethylhydrazine, pyridine, α-, β- or γ-picoline, nicotinic acid or isonicotinic acid, sulphinates, in particular benzosulphinic acids, or hydrogen sulphite.

Mono-, di- or trihalogenopyrimidinyl radicals, such as 2,4-dichloropyrimidin-6-yl, 2,4,5-trichloropyrimidin-6-yl, 2,4-dichloro-5-nitro- or -5-methyl- or -5-thiomethyl- or -5-carboxymethyl- or -5-carboxy- or -5-cyano- or -5-vinyl- or 5-sulpho- or -5-mono-, -di- or -trichloromethyl- or -5-carbalkoxypyrimidin-6-yl, 2,6-dichloropyrimidine-4-carbonyl, 2,4-dichloropyrimidine-5-carbonyl, 2-chloro-4-methyl-pyrimidine-5-carbonyl, 2-methyl-4-chloropyrimidine-5-carbonyl, 2-methylthio-4-fluoropyrimidine-5-carbonyl, 6-methyl-2,4-dichloro-pyrimidine-5-carbonyl, 2,4,6-trichloropyrimidine-5carbonyl, 2,4-dichloropyrimidine-5-sulphonyl, 2-chloroquinoxaline-3-carbonyl, 2- or 3-monochloroquinoxaline-6-carbonyl, 2- or 3-monochloroquinoxaline-6-sulphonyl, 2,3-dichloroquinoxaline-5- or -6-carbonyl, 2,3-dichloroquinoxaline-5- or -6-sulphonyl, 1,4-dichlorophthalazine-6-sulphonyl or -6-carbonyl, 2,4-dichloroquinoxaline-7- or -6-sulphonyl or -carbonyl, 2- or 3- or 4-(4',5'-dichloropyridaz-6'-one-1'-yl)-phenylsulphonyl or -carbonyl, β-(4',5'-dichloropyridaz-6'-one-1'-yl)-ethyl-carbonyl, N-methyl-N-(2,3-dichloroquinoxaline-6-sulphonyl)-aminoacetyl, N-methyl-N-(2,3-dichloroquinoxaline-6-carbonyl)-aminoacetyl, and the corresponding bromine and fluorine derivatives of the abovementioned chlorine-substituted heterocyclic radicals, and among these, for example, 2-fluoro-4pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,6-difluoro-5-thiomethyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 5-chloro-6-chloromethyl-2-fluoro-4-pyrimidinyl, 5-chloro-6-dichloromethyl-2-fluoro-4-pyrimidinyl, 5-chloro-2-dichloromethyl-6-fluoro-4-pyrimidinyl, 5-chloro-2-dichloromethyl-6-fluoro-4-pyrimidinyl, 5-chloro-2-trichloromethyl-6-fluoro-4-pyrimidinyl, 5-chloro-2-fluorodichloromethyl-6-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4pyrimidinyl, 2-fluoro-6-methyl-4-pyrimidinyl, 2-fluoro-5-chloro-6-methyl-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoro-methyl-4-pyrimidinyl, 2-fluoro-5-phenyl or 5-methyl-sulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 5-chloro-6-fluoro-2-methyl-4-pyrimidinyl, 5,6-difluoro-2-trifluoromethyl-4-pyrimidinyl, 5-chloro-6-fluoro-2-dichlorofluoromethyl-4-pyrimidinyl, 2-fluoro-5-chloro-pyrimidin-4-yl, 2-methyl-4-fluoro-5-methylsulphonylpyrimidin-6-yl, 2,6-difluoro-5-methyl-sulphonyl-4-pyrimidinyl, 2,6-dichloro-5-methylsulphonyl-4-pyrimidinyl, 2-fluoro-5-sulphonamido-4-pyrimidinyl, 2-fluoro-5-chloro-6-carbomethoxy-4-pyrimidinyl and 2,6-difluoro-5-trifluoromethyl-4pyrimidinyl; triazine radicals containing sulphonyl groups, such as 2,4-bis-(phenylsulphonyl)-triazin-6-yl, 2-(3'-carboxyphenyl)-sulphonyl-4-chlorotriazin-6-yl, 2-(3'-sulphophenyl)-sulphonyl-4-chlorotriazin-6-yl, 2,4-bis-(3'-carboxyphenylsulphonyl)-triazin-6-yl; pyrimidine rings containing sulphonyl groups, such as 2-carboxymethylsulphonyl-pyridimidin-4-yl, 2-methyl-sulphonyl-6-methyl-pyrimidin-4-yl, 2-methylsulphonyl-6-ethyl-pyrimidin-4-yl, 2-phenylsulphonyl-pyrimidin-4-yl, 2,6-bis-methylsulphonyl-5-chloro-pyrimidin-4-yl, 2,4-bis-methylsulphonyl-pyrimidine-5-sulphonyl, 2-methyl sulphonyl-pyrimidin-4-yl, 2-phenylsulphonyl-pyrimidin-4-yl, 2-tri-chloromethylsulphonyl-6-methyl-pyrimidin-4-yl, 2-methylsulphonyl-5-chloro-6-methyl-pyrimidin-4-yl, 2-methylsulphonyl-5-bromo-6-methyl-pyrimidin-4-yl, 2-methylsulphonyl-5-chloro-6-ethylpyrimidin-4-yl, 2-methylsulphonyl-5-chloro-6-chloromethyl-pyrimidin-4-yl, 2-methylsulphonyl-4-chloro-6-methylpyrimidine-5-sulphonyl, 2-methylsulphonyl-5-nitro-6-methylpyrimidin-4-yl, 2,5,6-tris-methylsulphonyl-pyrimidin-4-yl, 2-methylsulphonyl-5,6-dimethyl-pyrimidin-4-yl, 2-fluoro-6-carbonamido-4-pyrimidinyl, 2-fluoro-6-carbomethoxy-4pyrimidinyl, 2-fluoro-6-phenyl-4-pyrimidinyl, 2-fluoro-6-cyano-4-pyrimidinyl, 5-chloro-6-fluoro-2-methyl-4-pyrimidinyl, 5,6-difluoro-2-trifluoromethyl-4-pyrimidinyl, 5-chloro-6-fluoro-2-dichlorofluoromethyl-4-pyrimidinyl, 2-fluoro-5-chloropyrimidin-4-yl, 2-methyl-4-fluoro-5-methyl-sulphonylpyrimidin-6-yl, 2,6-difluoro-5-methyl-sulphonyl-4-pyrimidinyl, 2,6-dichloro-5-methylsulphonyl-4-pyrimidinyl, 2-fluoro-5-sulphonamido-4-pyrimidinyl, 2-fluoro-5-chloro-6-carbomethoxy-4-pyrimidinyl and 2,6-difluoro-5-trifluoromethyl-4-pyrimidinyl; triazine radicals containing sulphonyl groups, such as 2,4-bis(phenylsulphonyl)-triazin-6-yl, 2-(3'-carboxyphenyl)sulphonyl-4-chlorotriazin-6-yl, 2-(3'-sulphophenyl)sulphonyl-4-chloro-triazin-6-yl and 2,4-bis-(3'-carboxyphenylsulphonyl)-triazin-6-yl; pyrimidine rings containing sulphonyl groups, such as 2-carboxymethylsulphonyl-pyrimidin-4-yl, 2-methylsulphonyl-6-methyl-pyrimidin-4-yl, 2-methylsulphonyl-6-ethyl-pyrimidin-4-yl, 2-phenyl sulphonyl-5-chloro-6-methyl-pyrimidin-4-yl, 2,6-bis-methylsulphonyl-pyrimidin-4-yl, 2,6-bis-methylsulphonyl-5-chloro-pyrimidin-4-yl, 2,4-bis -methyl-sulphonyl-pyrimidine-5-sulphonyl, 2-methylsulphonyl-pyrimidin-4-yl, 2-phenylsulphonyl-pyrimidin-4-yl, 2-tri-chloromethyl-sulphonyl-6-methyl-pyrimidin-4-yl, 2-methylsulphonyl-5-chloro-6-methyl-pyrimidin-4-yl, 2-methylsulphonyl-5-bromo-6-methyl-pyrimidin-4-yl, 2-methylsulphonyl-5-chloro-6-ethyl-pyrimidin-4-yl, 2-methylsulphonyl-5-chloro-6-chloromethylpyrimidin-4-yl, 2-methylsulphonyl-4-chloro-6-methylpyrimidine-5-sulphonyl, 2-methylsulphonyl-5-nitro-6-methylpyrimidin-4-yl, 2,5,6-tris-methylsulphonyl-pyrimidin-4-yl, 2-methylsulphonyl-5,6-dimethyl-pyrimidin-4-yl, 2-ethylsulphonyl-5-chloro-6-methylpyrimidin-4-yl, 2-methylsulphonyl-6-chloropyrimidin-4-yl, 2,6-bis-methyl-sulphonyl-5-chloropyrimidin-4-yl, 2-methylsulphonyl-6-carboxypyrimidin-4-yl, 2-methylsulphonyl-5-sulphopyrimidin-4-yl, 2-methylsulphonyl-6-carboxymethoxy-pyrimidin-4-yl, 2-methylsulphonyl-5-carboxypyrimidin-4-yl, 2-methylsulphonyl-5-cyano-6-methoxy-pyrimidin-4-yl, 2-methylsulphonyl-5-chloropyrimidin-4-yl, 2-β-sulphoethylsulphonyl-6-methyl-pyrimidin-4-yl, 2-methylsulphonyl-5-bromo-pyrimidin-4-yl, 2-phenylsulphonyl-5-chloropyrimidin-4-yl, 2-carboxymethylsulphonyl-5-chloro-6-methyl-pyrimidin-4-yl, 2-methylsulphonyl-6-chloropyrimidine-4- and -5-carbonyl, 2,6-bis(methylsulphonyl)-pyrimidine-4- or -5-carbonyl, 2-ethylsulphonyl-6-chloropyrimidine-5-carbonyl or 2,4-bis-(methylsulphonyl)-pyrimidine-5-sulphonyl or carbonyl; 2-chlorobenzothiazole-5- or -6-carbonyl or -5- or -6-sulphonyl, 2-arylsulphonyl or alkylsulphonyl-benzothiazole-5- or -6-carbonyl or -5- or -6-sulphonyl, such as 2-methylsulphonyl- or 2-ethylsulphonyl-benzothiazole-5- or -6-sulphonyl or -carbonyl, 2-phenylsulphonylbenzothiazole-5- or -6-sulphonyl or -carbonyl and the corresponding 2-sulphonylbenzothiazole-5- or -6-carbonyl or -sulphonyl derivatives containing sulpho groups in the fused-on benzene ring, 2-chloro-benzoxazole-5- or -6-carbonyl or -sulphonyl, 2-chloro-benzimidazole-5- or -6-carbonyl or -sulphonyl, 2-chloro-1-methylbenzimidazole-5- or -6-carbonyl or sulphonyl, 2-chloro-4-methyl-1,3-thiazole-5-carbonyl or -4- or -5-sulphonyl and the N-oxide of 4-chloro- or 4-nitroquinoline-5-carbonyl.

The dyestuffs B) are preferably so-called fibre-reactive dyestuffs of the abovementioned classes of dyestuff which contain one or two fibre-reactive radicals of the type mentioned, the fibre-reactive radicals of which are capable of reacting with the primary and secondary amino groups of the polyamidoamines A) to form covalent chemical bonds. Such fibre-reactive dyestuffs are described in numerous instances in the literature, and a large number are available as commercial products. A list of fibre-reactive commercial products can be found, for example, in "Colour Index", 3rd edition (4th revision, 1992), vol. 9, pages 5151–5168.

Those fibre-reactive dyestuffs which contain only one fibre-reactive group and undergo chemical bonding by addition or substitution reactions with the primary and secondary amine groups of the polyamidoamine under neutral to weakly alkaline conditions at temperatures of 20° to 80° C. are preferred for the preparation of the polymeric dyestuffs according to the invention.

In the preparation of the dyestuffs according to the invention, it is preferable for the dyestuff B) first to be built up in a preliminary synthesis stage by reaction of a dyestuff B1), which is free from groups which are reactive towards primary and secondary amino groups and preferably correspond to one of the abovementioned dyestuff classes and contains one or two, preferably one, nucleophilic centre, with a di- or trifunctional aliphatic, aromatic or heterocyclic compound which contains two or three electrophilic centres, onto which two or three leaving groups are optionally bonded, the molar ratio of this compound to the dyestuff B1) preferably being 1:2 in the case of reaction with a trifunctional compound.

In one preparation variant, it is also possible first to react the polyamidoamine A) with a di- or trifunctional aliphatic, aromatic or heterocyclic compound which contains two or three electrophilic centres which are reactive towards primary and secondary amino groups and onto which in each case a leaving group is bonded, and then to react the polyamidoamine thus modified with a dyestuff B1) which is free from groups which are reactive towards primary and secondary amino groups and which preferably belongs to the abovementioned dyestuff classes and has one or more nucleophilic centres.

Another variant for preparation of the dyestuffs according to the invention comprises reacting a reactive dyestuff precursor with the polyamidoamine A) and, after the reaction, building up the actual chromophore by suitable condensation or diazotization and coupling reactions on the polymer.

The reaction of a reactive precursor with an amine-containing polymer and the build-up of dyestuff on the polymeric matrix are known per se and are described, for example, in U.S. Pat. Nos. 3,920,855, 4,018,826 and 4,375,357.

The following formula is intended to illustrate a specific embodiment of the polymeric dyestuffs according to the invention:

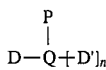

wherein

P represents the radical of a polyamidoamine A) and D-Q-[D']$_n$ represents the radical of a dyestuff B), wherein D and D' are identical or different and in each case represent a chromophoric radical, Q represents a bridge member which, in the case where n=0, is derived from a difunctional and, in the case where n=1, is derived from a trifunctional compound which is reactive towards primary and secondary amines, and n represents 0 or 1.

When the synthesis of the polymeric dyestuffs according to the invention has ended, as a rule a solution is obtained, which can be formulated directly to a liquid finished form after purification by pressure permeation. In many cases, a usually amorphous powder can be isolated by concentration of the solution or, where appropriate, of the suspension, and can be worked up to a powder or again a liquid finished form by the customary route. If pressure permeation is carried out, it is effected on semipermeable membranes either as reverse osmosis or ultra- or nanofiltration, or by a combination of these methods. A preferred method is ultrafiltration when using membranes which are permeable to salts and compounds having a molecular weight of less than about 20,000 dalton. Low molecular weight contents of the polymeric dyestuff can be separated off in this manner, and in particular also monomeric dyestuff hydrolysates which are formed, for example, by hydrolysis of fibre-reactive dyestuffs and are readily formed as by-products in the abovementioned reactions.

The dyestuffs according to the invention, in the form of both solid and liquid preparations, dye materials containing cellulose groups and amide groups, in particular, paper, cotton and leather, and produce dyeings having a good wet- and light-fastness. They are particularly suitable for the preparation of recording liquids for ink jet printing processes.

For preparation of recording liquids, no intermediate isolation of the dyestuffs according to the invention is necessary. The solution obtained or, where appropriate, suspension obtained in their synthesis can be desalinated directly using membrane separation processes and freed from undesirable low molecular weight by-products, and then, if appropriate, converted into the finished form desired for ink jet printing processes by addition of water, organic or inorganic bases, water-soluble organic solvents and other customary additives.

Possible inorganic bases are lithium hydroxide, sodium hydroxide, potassium hydroxide, lithium carbonate, sodium carbonate and potassium carbonate, and possible organic bases are ethanolamine, diethanolamine, triethanolamine, N-methylethanolamine, N,N-dimethylethanolamine, N-methyldiethanolamine, 1-amino-2-propanol, 2-amino-1-propanol, diisopropylamine, N-2-hydroxyethyldiisopropylamine or tris-N,N,N-[2-(2-hydroxyethoxy)-ethyl]amine.

Suitable organic solvents are polyhydric alcohols and ethers and esters thereof, carboxylic acid amides, ureas, cyclic amides and ureas, sulphones and sulphoxides; particularly suitable solvents are, for example, ethylene glycol and the monomethyl, -ethyl and -propylether thereof, 1,2-propylene glycol, 1-methoxy-2-propanol, 2-methoxy-1-propanol, 1-ethoxy-2-propanol, 2-ethoxy-1-propanol, diethylene glycol, diethylene glycol monomethyl and -ethyl ether, triethylene glycol, 1,5 -pentanediol, 2-hydroxyethyl acetate, 2-(2-hydroxyethoxy)-ethyl acetate, glycerol, pyrrol idone, N-methylpyrrolidone, 6-caprolactam, N-methyl-6-caprolactam, tetramethylurea, 1,3-dimethyl-2-imidazolidone, N,N'-dimethylpropyleneurea, dimethyl sulphoxide, dimethyl sulphone, sulpholane and polyethylene glycols having a molecular weight of up to 500 dalton.

Other possible customary additives in printing inks are those ionic or nonionic substances with which the viscosity and/or surface tension can be brought to the ranges required for use.

The recording liquids according to the invention are composed of:

0.5 to 20% by weight of one or more polymeric dye-stuffs according to the invention,
50 to 99.5% by weight of water,
0 to 30% by weight of one or more organic solvents, and
0 to 30% by weight of additives which influence viscosity and/or surface tension,
the sum of the contents mentioned adding up to 100%.

The recording liquids according to the invention are distinguished by the fact that no precipitates are deposited even during relatively long storage, and that the fine nozzles of recording heads do not block even with slight evaporation. They are fixed rapidly on the various recording media, do not run and form sharp edges without fringes. Images of high resolution are obtained with excellent water-resistance, light-fastness and resistance to abrasion.

A. Preparation of the Polyamidoamine Resins

Example 1

292 g of adipic acid are introduced into an initial amount of 216.3 g of diethylenetriamine, and the mixture is heated under reflux for one hour. The reflux condenser is then replaced by a distillation bridge and heating is continued for about 3 hours, while uniformly distilling off the water of reaction, until the internal temperature has risen to 197° C. The polyamide melt is now cooled to 165° C., 436 g of water are carefully added and the mixture is subsequently stirred at 90° to 95° C. for one hour. After the mixture has been cooled to room temperature, a clear, yellow solution having a solids content of 49.5% by weight, a viscosity of about 390 mPa.s and a base equivalent weight of 383 is obtained. The average molecular weight is 4363.

Example 2

If a mixture of 292 g of adipic acid and 226.6 g of diethylenetriamine is treated as described under Example 1 and, after cooling to 165° C., 446 ml of water instead of 436 ml are added to the melt, a clear, pale yellow polyamidoamine solution is likewise obtained. The solids content and the average molecular weight here are 49.4% by weight and 2233 respectively. A value of 351 is found as the base equivalent weight and a value of 381 mPa.s is found for the viscosity.

B. Preparation of Polymeric Dyestuffs

Example 3

223 g of a paste of the dyestuff of the formula

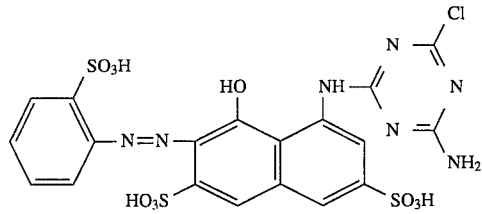

having a dyestuff content of 41% are stirred in 500 ml of water. 111 g of polyamidoamine solution of Example 1 (corresponding to 2 mol of nucleophilic amine per mol of dyestuff) are introduced into the solution which has formed after a short time. A pH of 10.5 is initially established, but drops when the solution is heated to 80° C., and is maintained at 8.5 by dropwise addition of 2N sodium hydroxide solution. After 30 minutes at 80° C., no further starting dyestuff can be detected in the thin layer chromatogram or by HPLC. The thinly mobile solution of the condensation product formed, which has an average molecular weight of 11,508, is discharged dropwise and initially very slowly into 600 ml of 1N hydrochloric acid. The precipitate which initially separates out in a somewhat tacky form becomes gradually crystalline. It is separated off by filtration, stirred into one liter of water and dissolved again with sodium hydroxide solution at pH 8.5. 8 g of a commercially available clarifying auxiliary based on kieselguhr (for example Dicalite®) are added to the solution and, after the mixture has been stirred for one hour, are filtered off. A stable, approximately 10% strength solution of a polymeric dyestuff having a γmax value of 521 nm, the chromophore substance of which corresponds to the radical of the formula of one hour, while stirring vigorously. The pH is then brought to 8.5 with 2N sodium hydroxide solution, the temperature is allowed to rise to room temperature, while the pH is kept constant, and stirring is continued for some hours until no further sodium hydroxide solution is required for maintaining the pH.

When the condensation reaction has ended, 389 g of the polyamidoamine of Example 1 (corresponding to 7 mol of nucleophilic amine per mol of cyanuric chloride) are added and heating of the entire mixture is continued at pH 8.5 for one hour at 80° C. The mixture is allowed to cool to room temperature, 30 g of a clarifying auxiliary are added, the mixture is stirred for one hour and, after filtration, 3.9 liters of a dyestuff solution are obtained, which comprise about 400 g of magenta-coloured dyestuff according to the invention having a γmax value of 518 nm, the chromophore of which corresponds to the formula

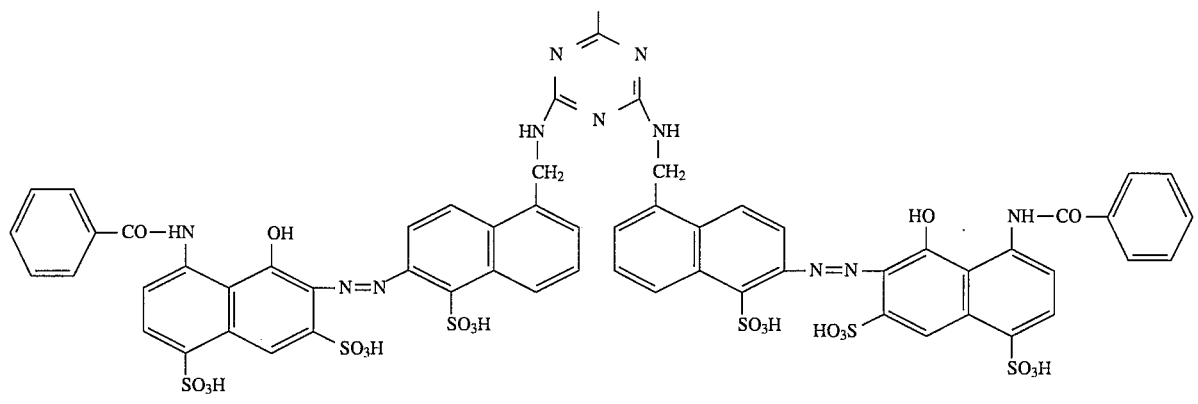

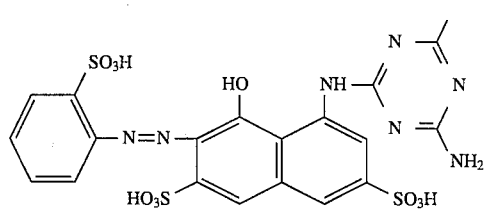

is obtained.

If 20 g of this solution are mixed with 70 g of water and 10 g of diethylene glycol, a valuable recording liquid is obtained with which ink jet prints having wet-fastness properties can be achieved in light-fast magenta shades on the customary writing papers.

Example 4

564 g of a paste of the dyestuff of the formula

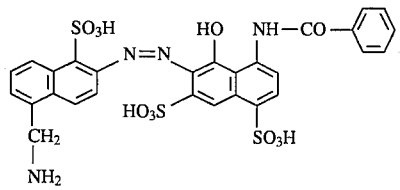

having a dyestuff content of 35.3% are suspended in 1600 ml of water and are dissolved at pH 11.7 by dropwise addition of 30 ml of 10N sodium hydroxide solution. The solution is discharged onto an initial mixture of 26.74 g of cyanuric chloride in 500 ml of water and 800 g of ice in the course The average molecular weight here is 9117.

The dyestuff solution, comprising about 0.8% by weight of NaCl, is treated in a laboratory ultrafiltration unit on a semipermeable membrane with a cutoff limit of 3000 dalton for further purification. The solution is in this case first concentrated to a volume of 2000 ml, and, after topping up with 2 liters of water, this operation is repeated. The NaCl content is now only 0.39%, at twice the dyestuff concentration.

A magenta-coloured ink having good use properties is likewise obtained from the stable dyestuff solution of lower salt content by dilution with 3.5 parts of water and 0.5 parts of diethylene glycol.

If, instead of 389 g of the polyamide of Example 1, 333 g or 444 g of this polymer are used and the procedure is otherwise as described in this example, magenta-coloured inks having similarly good properties are obtained.

Example 5

If the procedure is as in Example 4, but instead of 389 g of polyamidoamine of Example 1, only 249 g of polyamidoamine of Example 2 are used, about 3.8 liters of a similarly magenta-coloured dyestuff solution are obtained. In this case, the molar ratio of cyanuric chloride to a nucleophilic polyamidoamine nitrogen is 1:5. The solution comprises 334 g of the dyestuff according to the invention having a $\lambda_{max}$ value of 518 nm. The chromophore without the polyamidoamine radical corresponds to that of Example 4.

Example 6

569 g of paste of the dyestuff of the formula

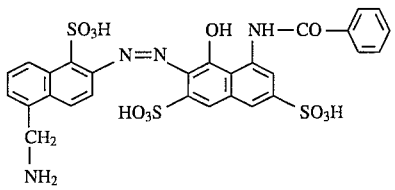

having a dyestuff content of 35.0% are reacted as described in Example 4 with 26.74 g of cyanuric chloride (0.1449 mol) and 249 g of polyamidoamine of Example 2 (0.7246 mol of nucleophilic amine=5 times the molar amount of cyanuric chloride). About 3.8 liters of a magneta-coloured dyestuff solution in which 334 g of the dyestuffs according to the invention having a $\lambda_{max}$ value of 522 nm are dissolved are again obtained. The chromophore of the dyestuff containing polyamidoamine corresponds to the formula solution is brought back from 9.3 to 9.0 by addition of a few ml of acetic acid. 30 g of a clarifying auxiliary are added, the mixture is stirred for one hour and filtered and the resulting 2.1 liters of filtrate are rinsed 5 times with in each case 2.1 liters of demineralized water in an ultrafiltration unit on a semipermeable membrane having a separation limit of 15,000 dalton.

The solution, which is now virtually free from electrolyte, is a magenta-coloured ink having good use properties. It comprises 318 g of the dyestuff according to the invention, the polyaminoamide-free chromophore of which corresponds to the formula

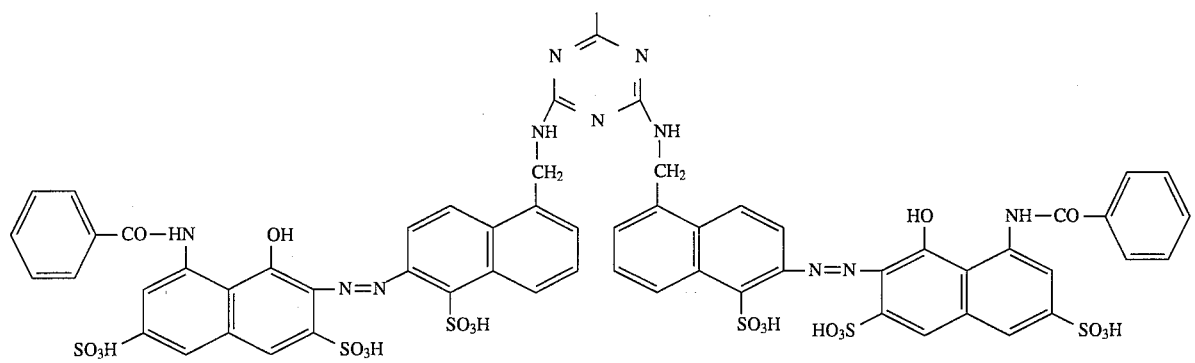

Example 7

1285 g of an aqueous suspension of the dyestuff of the formula

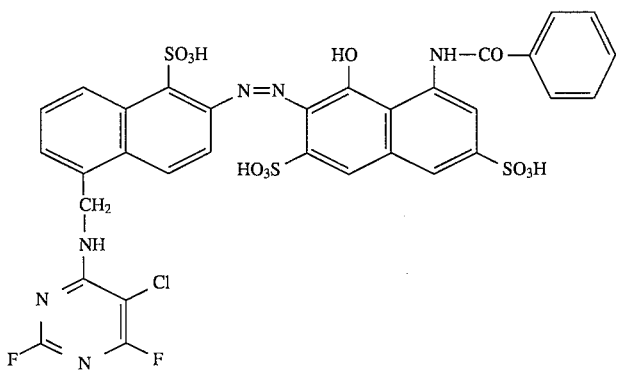

having a dyestuff content of 13.0% (0.2 mol) are diluted with 700 ml of water, and 343 g of polyamidoamine of Example 2 (1 mol of nucleophilic amine) are added. After the mixture has been cooled to room temperature, the pH of the reaction

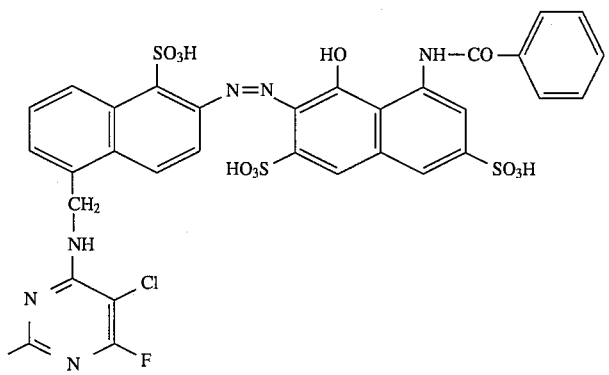

The $\lambda_{max}$ value is 543 nm.

Example 8

282 g of colour base from Example 4 are suspended in 800 ml of water and dissolved at pH 12 with lithium hydroxide. The solution is discharged onto an initial mixture of 27 g of cyanuric chloride in 500 ml of water and 200 g of ice, while stirring vigorously. The mixture is stirred for some hours, while keeping the pH constant at 7 with 5% strength lithium hydroxide solution and warming to room temperature, until no further lithium hydroxide solution is consumed.

When the condensation reaction has ended, 158 g of the polyamidoamine of Example 1 are added (the molar ratio of cyanuric chloride to a nucleophilic polyamidoamine nitrogen is 1:2), the mixture is heated at 80° C. for one hour and the pH is kept at 8.5. The mixture is allowed to cool to room temperature and is filtered, and 2 l of a dyestuff solution which comprises about 200 g of magenta-coloured dyestuff according to the invention with the chromophore of the formula are reacted in 1,800 ml of water at 50° C. and pH 8.5 with 171.5 g of polyamidoamine of Example 2 (corresponding to 5 mol of nucleophilic amine per mol of dyestuff). After pressure permeation on a semipermeable membrane, a low-salt 13.2% strength by weight solution of a dyestuff according to the invention having a λmax value of 384 nm, the chromophore of which corresponds to the formula

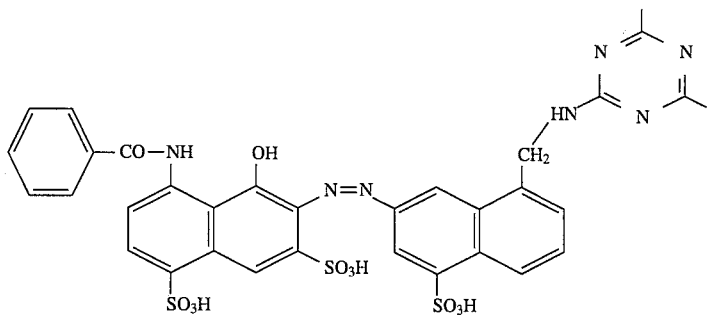

and a $\lambda_{max}$ value of 518 nm are obtained.

Example 9

95.4 g of dyestuff of the formula

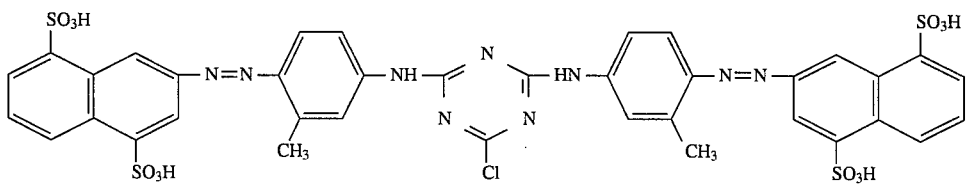

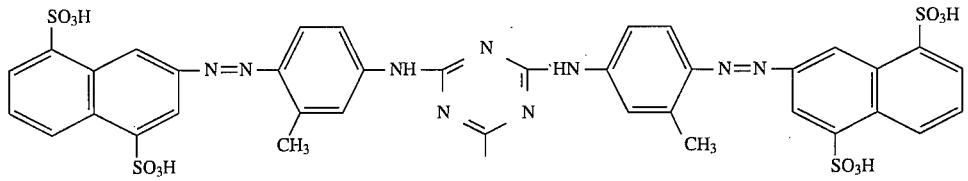

is obtained.

15 ml of this dyestuff solution are formulated to a yellow recording liquid with 10 ml of diethylene glycol and 75 ml of water. When used in commercially available ink jet printers, this does not block any nozzles and produces light- and wet-fast typefaces in a yellow colour.

Example 10

72.4 g of dyestuff of the formula

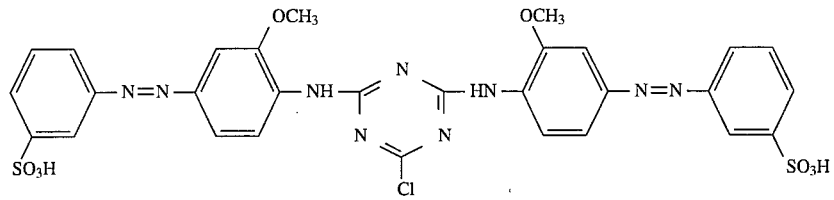

are reacted with 115 g of polyamidoamine of Example 1 (corresponding to 3.04 mol of nucleophilic amine per mol of dyestuff) in a manner similar to that described under Example 4 to give the polymeric dyestuff having a $\lambda_{max}$ value of 400 nm, the chromophore of which corresponds to the formula

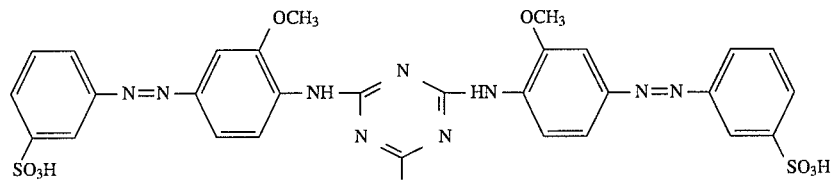

Here too, yellow liquid formulations which are suitable for ink jet printing can also be prepared.

Example 11

300 g of dyestuff (90%) pure of the formula

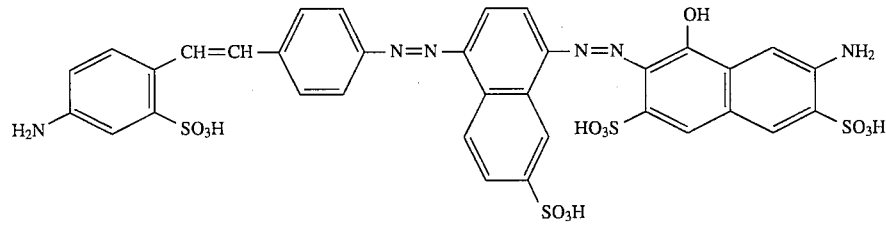

are suspended in 2 l of water, and 29.5 g of cyanuric chloride are added. The pH is kept at 6.5 with 5% strength lithium hydroxide solution until no further lithium hydroxide is consumed. When the condensation reaction has ended, 364 g of polyamidoamine of Example 1 are added. The molar ratio of cyanuric chloride to a nucleophilic polyamidoamine nitrogen is 1:6. The mixture is heated at 80° C. for 2 hours and the pH is kept at 8.5. The mixture is allowed to cool to room temperature and is filtered, and a black dyestuff according to the invention having the polyamidoamine-free chromophore body of the formula

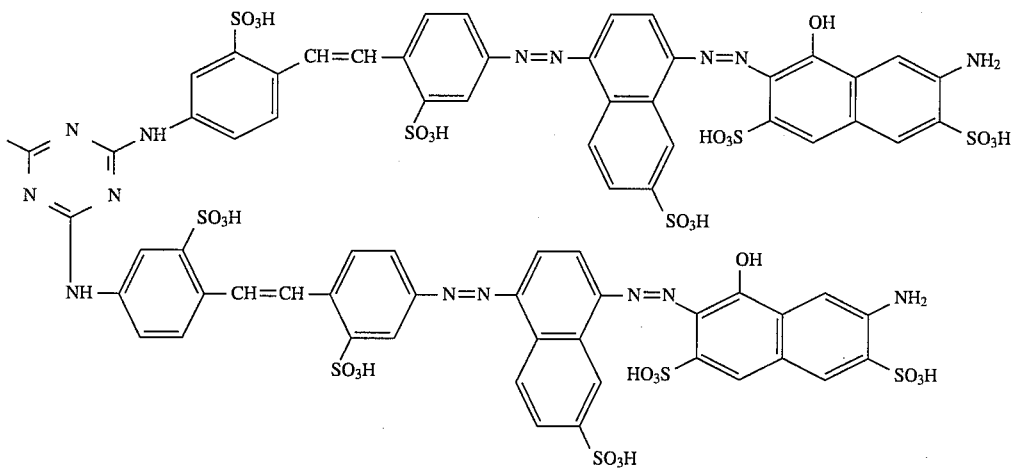

and a $\lambda_{max}$ value of 609 nm is obtained.

Example 12

The procedure is as in Example 11, but instead of the colour base of Example 11, 242 g (90%) of the colour base of the formula

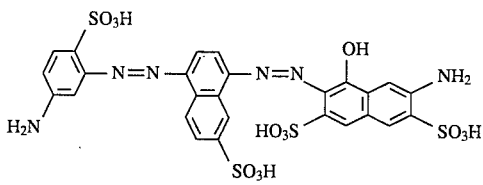

are employed, and 303 g of polyamidoamine (the molar ratio of cyanuric chloride to a nucleophilic polyamidoamine nitrogen is 1:5) from Example 1 are used. The dyestuff has a $\lambda_{max}$ value of 604 nm.

We claim:

1. A polymeric dyestuff obtainable by reaction of
A) Polyamidoamines having an average molecular weight, determined as the weight-average, of 260 to 10,000, which in turn are obtainable by reaction of reactants consisting essentially of at least one aliphatic polyamine (I) which contain at least two primary amino groups and at least one secondary amino group, optionally a diamine (II), at least one dicarboxylic acid (e) from the group consisting of aliphatic saturated $C_2$–$C_{12}$-dicarboxylic acids, aromatic dicarboxylic acids or functional derivatives thereof, optionally a $\omega$-$C_3$–$C_8$-amino-carboxylic acid or a lactam thereof with the proviso that the molar ratio of the sum of primary and secondary amino groups contained in (I) and optionally in II to the carboxyl groups or to the functionally derived carboxyl groups in ($\alpha$) is greater than 1, with B) a dyestuff which contains, per molecule, at least one group which is reactive towards primary and secondary amino groups, the molar ratio of the sum of primary and secondary amino groups contained in A) to B) being 1 to 15.

2. A dyestuff according to claim 1, wherein the aliphatic polyamine (I) is a compound of the formula

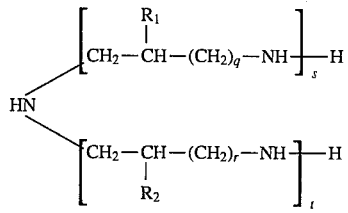

wherein $R_1$ and $R_2$ independently of one another represent hydrogen, methyl or ethyl, q and r independently of one another represent 0, 1, 2, 3 or 4 and s and t independently of one another represent 1, 2, 3, 4, 5 or 6.

3. A dyestuff according to claim 1, wherein the diamine II is a compound of the formula $$H_2N-R_3-NH_2$$

wherein $R_3$ represents $C_2$–$C_9$-alkylene or a divalent radical of the formula

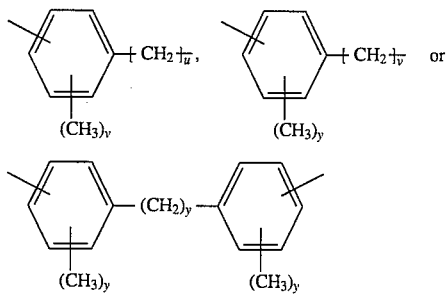

wherein u represents 1 or 2, v represents 0 or 1 and y represents 0, 1, 2 or 3.

4. A dyestuff according to claim 1, wherein the polyamidoamines A) are those having a base equivalent weight of 140 to 800.

5. A dyestuff according to claim 1, wherein the dyestuffs B) are those which are derived from the group consisting of phthalocyanine, nitroaryl, triphenylmethane, oxazine, triphendioxazine, phenazine, stilbene, thiazine and xanthene dyestuffs, anthraquinone, monoazo, disazo and polyazo dyestuffs, and metal complex dyestuffs.

6. A dyestuff according to claim 1, wherein the dyestuffs B) are those which contain, as groups which render them water-soluble and independently of one another, one or more unsubstituted sulphonamide groups, or sulphonamide groups which are alkyl-substituted once or twice on the nitrogen, alkyl- sulphonyl groups, carboxyl groups, carboxylate groups or sulphonate groups.

7. A dyestuff according to claim 1, wherein the dyestuffs B) are fibre-reactive dyestuffs which contain one or two radicals of the formulae $$-SO_2-A\ -CO-A,\ -SO_2-CH=CH_2,\ -SO_2-CH_2CH_2-A,$$
$$-CO-CH_2CH_2-A,\ -CONH-CH_2-A,\ -SO_2NH-$$
$$CH_2CH_2-A\ -NHCO-CH_2CH_2-A,$$

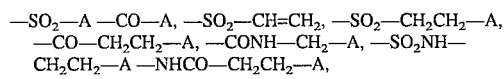

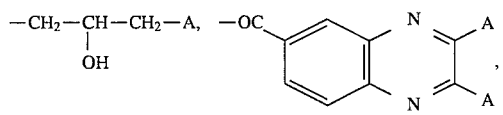
where $R^1$ = H, Cl, $CH_3$, CN

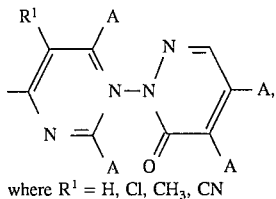

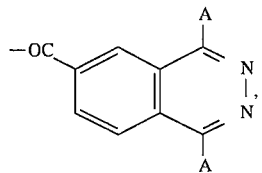

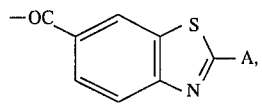

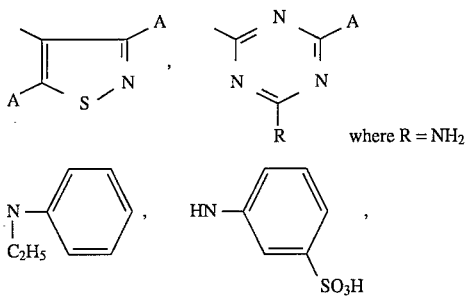
where R = $NH_2$ $OCH_3$ or $OCH_2CH_2OCH_3$, where

A=Cl, F, $OSO_3H$, $N(CH_3)_3Cl$, $SO_2CH_3$, $OPO_3H$ and $SO_2C_2H_5$.

8. Printing ink comprising at least one dyestuff according to claim 1.

9. Printing ink comprising 0.5 to 20% by weight of one or more polymeric dyestuffs according to claim 1, 50 to 99.5% by weight of water, 0 to 30% by weight of one or more organic solvents, and 0 to 30% by weight of additives which influence viscosity or surface tension or both, the sum of the contents adding up to 100%.

10. A recording liquid for ink jet recording systems comprising the printing ink of claim 8.

11. A recording liquid for ink jet recording systems comprising the printing ink of claim 9.

* * * * *

UNITED STATES PATENT AND TRADEMARK OFFICE
CERTIFICATE OF CORRECTION

PATENT NO. : 5,534,052
DATED : July 9, 1996
INVENTOR(S) : Mennicke, et al.

It is certified that error appears in the above-indentified patent and that said Letters Patent is hereby corrected as shown below:

Col. 19, line 50    Delete " (e) " and substitute -- (d) --

Signed and Sealed this

Third Day of December, 1996

Attest:

BRUCE LEHMAN

*Attesting Officer*    Commissioner of Patents and Trademarks

UNITED STATES PATENT AND TRADEMARK OFFICE
CERTIFICATE OF CORRECTION

PATENT NO. : 5,534,052
DATED : July 9, 1996
INVENTOR(S) : Mennicke, et al.

It is certified that error appears in the above-indentified patent and that said Letters Patent is hereby corrected as shown below:

Col. 11, line 15  Delete "$\Upsilon$ max " and substitute -- $\lambda$ max --

Col. 12, line 15  Delete "$\Upsilon$ max " and substitute -- $\lambda$ max --

Col. 21 line 28  Delete " 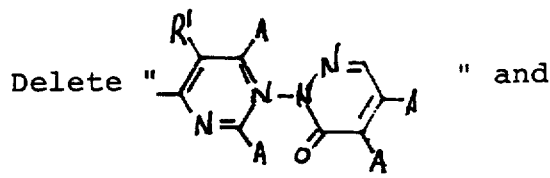 " and substitute

-- 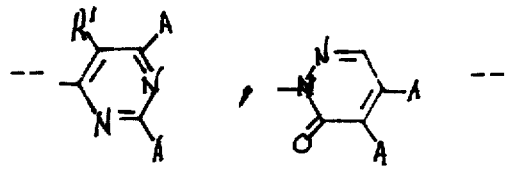 --

Signed and Sealed this

Twenty-fifth Day of February, 1997

Attest:

BRUCE LEHMAN

*Attesting Officer*      *Commissioner of Patents and Trademarks*